United States Patent
Yamashita

(10) Patent No.: US 6,202,313 B1
(45) Date of Patent: Mar. 20, 2001

(54) PENCIL-TYPE PLUMB-BOB DEVICE

(75) Inventor: Susumu Yamashita, Tokyo (JP)

(73) Assignee: Masato Co., Ltd., Tokyo (JP)

( * ) Notice: Subject to any disclaimer, the term of this patent is extended or adjusted under 35 U.S.C. 154(b) by 0 days.

(21) Appl. No.: 09/216,828

(22) Filed: Dec. 21, 1998

(30) Foreign Application Priority Data

Dec. 24, 1997 (JP) .................................................. 9-366026
Dec. 15, 1998 (JP) ................................................ 10-375417

(51) Int. Cl.[7] .............................. G01C 15/00; G01C 5/00; B25H 7/00; F21L 15/08
(52) U.S. Cl. .............................. 33/286; 33/392; 33/666; 33/DIG. 21; 362/410; 362/413; 362/414
(58) Field of Search ................... 33/290, 291, DIG. 21, 33/666, 286, 391, 392; 362/410, 413, 414

(56) References Cited

U.S. PATENT DOCUMENTS

| | | | | |
|---|---|---|---|---|
| 3,471,234 | * | 10/1969 | Studebaker | 33/286 |
| 3,588,249 | * | 6/1971 | Studebaker | 33/290 |
| 4,597,186 | * | 7/1986 | Markos | 33/292 |
| 4,625,428 | * | 12/1986 | Griffen | 33/392 |
| 4,878,296 | | 11/1989 | Londino, Jr. | 33/286 |
| 5,012,585 | | 5/1991 | DiMaggio | 33/286 |
| 5,184,406 | | 2/1993 | Swierski | 33/291 |
| 5,481,809 | * | 1/1996 | Rooney | 33/392 |
| 5,509,209 | | 4/1996 | Swierski | 33/282 |
| 5,537,205 | | 7/1996 | Costa et al. | 33/286 |
| 5,572,796 | | 11/1996 | Breda | 33/286 |
| 5,572,797 | | 11/1996 | Chase | 33/286 |
| 5,644,850 | | 7/1997 | Costales | 33/286 |
| 5,754,287 | | 5/1998 | Clarke | 33/286 |
| 5,912,733 | * | 6/1999 | Dunlop et al. | 33/286 |
| 5,983,510 | * | 11/1999 | Wu et al. | 33/286 |
| 6,021,578 | * | 2/2000 | DeVingo | 33/392 |
| 6,023,849 | * | 2/2000 | Montes | 33/392 |

* cited by examiner

Primary Examiner—Randy W. Gibson
(74) Attorney, Agent, or Firm—Jones, Tullar & Cooper, P.C.

(57) ABSTRACT

The present invention concerns a plumb-bob device for vertical pointing operation with a beam-casting housing supported vertically by a plurality of legs via a gyroscope mechanism. The device has a reduced size, so that it can be handled quickly and conveniently on a construction cite. The legs are mounted for expansion and contraction in and around an upper end portion via the gyroscope mechanism on and around an upper end portion of the housing. The legs each have an inner surface complementary to the outer periphery of the housing. The device thus can assume a shape just like a long pencil when the legs are contracted. For vertical pointing operation, the housing is held vertically by the legs in an expanded state. The device can be used as an inverted plumb-bob device and also as a pointer by mounting a retaining member, which has a string, on lower end portions of the legs in the contracted state thereof.

4 Claims, 5 Drawing Sheets

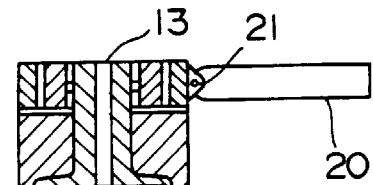
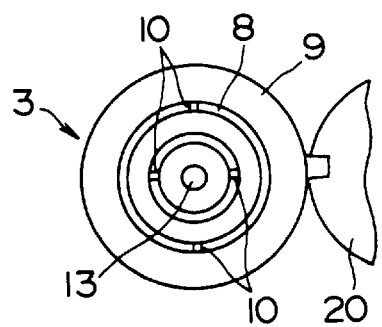
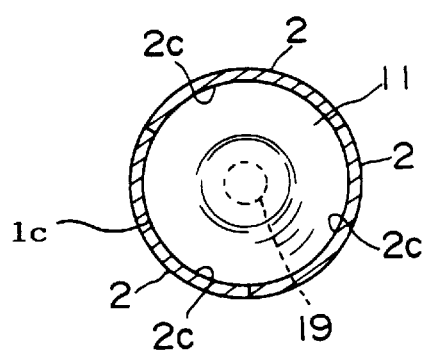
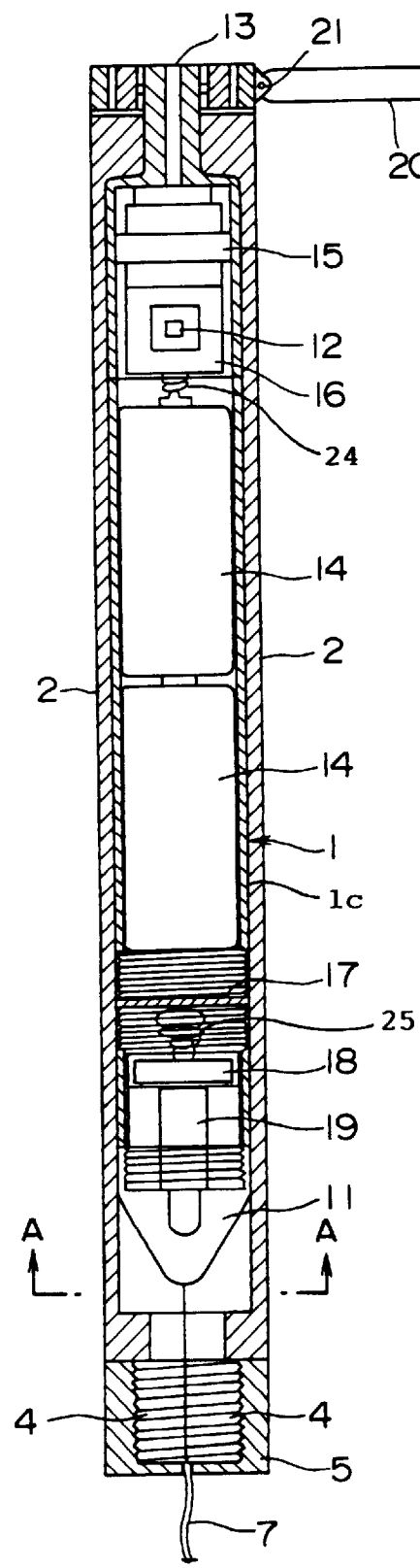
FIG. 4A
FIG. 4B
FIG. 4C

PENCIL-TYPE PLUMB-BOB DEVICE

BACKGROUND OF THE INVENTION

1. Field of the Invention

The present invention relates to a plumb-bob device used on construction cites for a level pointing operation, i.e., indicating the positional relation between a floor surface and a ceiling surface.

2. Description of the Prior Art

A well-known plumb-bob device of the pertaining type indicates a leveling reference point by emitting a light beam, such as a laser beam. This plumb-bob device comprises a beam-emitting housing, which emits a linear light beam indicating a floor reference point from its lower end and also emits a linear light beam indicating a ceiling reference point from its upper end toward a ceiling surface, and a plurality of legs mounted by a gyroscope mechanism on and around the beam-emitting housing. The beam-emitting housing accommodates as light sources a high light intensity LED and a visible semiconductor laser, for instance. In the level pointing operation, a linear light beam is cast from the lower end of the beam-emitting housing closet onto a floor surface, thus indicating a floor reference point. Also, a liner laser beam is cast from the upper end of the beam-emitting housing onto a ceiling surface, thus indicating a ceiling reference point.

In the above prior art plumb-bob device, however, the legs are made from pipes or bars, and greatly project from the beam-emitting housing when they are held in an expanded state. Besides, the beam-emitting housing has a considerably large size. Therefore, even a plumb-bob device of reduced size is insufficient for being freely carried on the construction site.

Furthermore, the construction site is usually occupied by various machines and apparatuses, and therefore it may be difficult to secure sufficient space for storing the plumb-bob device. Accordingly, a plumb-bob device which is smaller in size and can be quickly and conveniently handled in use has been demanded.

SUMMARY OF THE INVENTION

It is thus an object of the present invention to provide a small-in-size and conveniently portable plumb-bob device, which permits a vertical level pointing operation on a construction site to be done more efficiently, and also can be made compact when it is not used for the vertical level pointing operation.

To attain the above object, according to the present invention a pencil-type plumb-bob device is provided, which comprises a beam-casting housing for casting, from the lower end, a linear light beam indicating a floor reference point on a floor surface and also casting, from the upper end, a linear light beam indicating a ceiling reference point on a ceiling surface corresponding to the floor surface, and a plurality of legs mounted for expanding and contracting by a gyroscopic mechanism on and around the upper end of the beam casting housing such as to be able to support the beam-casting housing vertically for the vertical level pointing operation and also extend in the longitudinal direction of the beam-casting housing, the legs each having a curved or concave inner surface substantially complementary to the outer periphery of the beam-casting housing, so that the legs can wrap the beam-casting housing so as to close the housing when they are contracted.

According to the present invention, the pencil-type plumb-bob device further comprises a retaining member mounted on the lower ends of the legs in the contracted state thereof to retain the legs in this state.

The plumb-bob device having the above construction according to the present invention, thus permits a vertical level pointing operation to indicate the positional relation between a floor surface and a ceiling surface to be done by expanding the legs after removing the retaining member and setting the legs on the floor surface. Since the legs each have the concave inner surface substantially complementary to the outer periphery of the beam-casting housing, when not doing the vertical pointing operation they can be brought, by contacting them, into close contact with the outer periphery of the beam casting housing such that they wrap the same, thus providing a pencil-like elongate overall shape. By mounting the retaining member on the lower ends of the legs in this state, the legs can be held in the contracted state, and the device thus can be freely carried.

According to the present invention, the retaining member has a blind-nut-like shape, and has a string attached to it. The beam-casting housing thus can be suspended in the inverted state by the string of the retaining member mounted on the ends of the contracted legs, and in this state a linear light beam can be cast on the floor surface or the like to effect a suspended plumb-bob device function.

According to the present invention, the pencil-type plumb-bob device further comprises a cap, which can open and close the upper end of the beam-casting housing and protect an upper end beam-casting part thereof, and a device retainer provided on the outer periphery of one of the legs.

With this structure, when not doing the vertical level pointing operation, the beam-casting part can be protected by closing the cap. In addition, with the device retainer provided on one of the legs, the device can be accommodated and held in a chest pocket or the like, and can be freely carried. Furthermore, by opening the cap the device can be used as a pointer as well.

According to the present invention, the pencil-type plumb-bob device further comprises a switch, which is provided on the outer periphery of the beam-casting housing for controlling the emission of the liner light be cast from the upper end of the beam-casting housing onto a ceiling reference point, and a window provided in one of the legs at a position thereof correspond to the position of the switch.

With this structure, the switch can be operated from the outside through the window for operation even in the contracted state of the legs.

BRIEF DESCRIPTION OF THE DRAWINGS

FIGS. 4A to 4C show the beam-casting housing in the device shown in FIG. 1, FIG. 4A being a longitudinal sectional view, FIG. 4B being an enlarged-scale top view, FIG. 4C being an enlarged-scale sectional view taken along line A—A in FIG. 4A;

DESCRIPTION OF THE PREFERRED EMBODIMENT

An embodiment of the pencil-type plumb-bob device according to the present invention will now be described with reference to the drawings.

Figure 1:
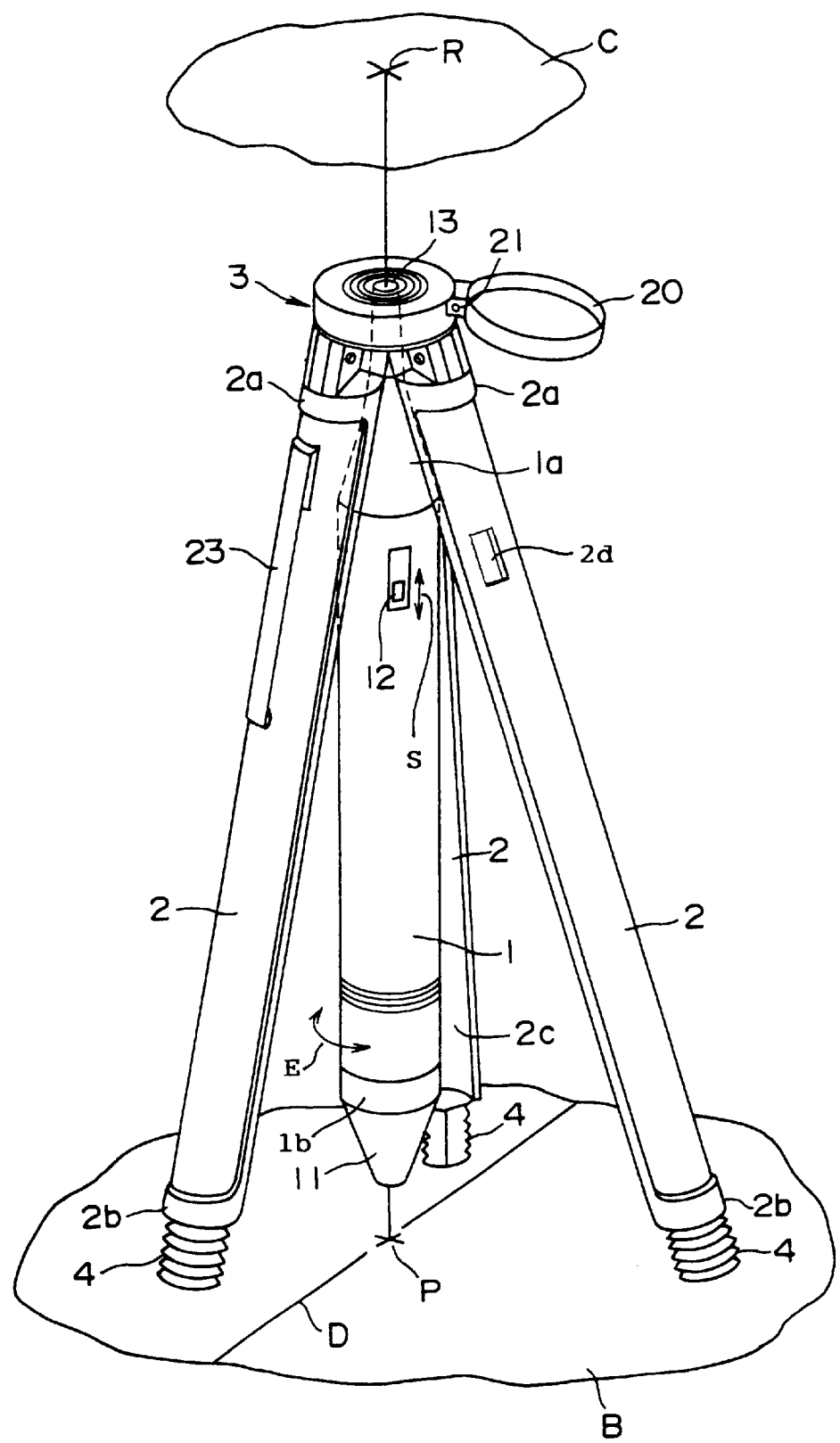
FIG. 1 is a perspective view showing an embodiment of the pencil-type plumb-bob device according to the present invention in a state of use as such.

FIG. 1 shows the plumb-bob device according to the present invention in use for vertical pointing operation. Reference numeral 1 designates a beam-casting housing, and 2 designates three legs mounted by a gyroscope mechanism 3 on the upper end 1a of the beam-casting housing 1 and along the axis thereof.

Figure 2A:
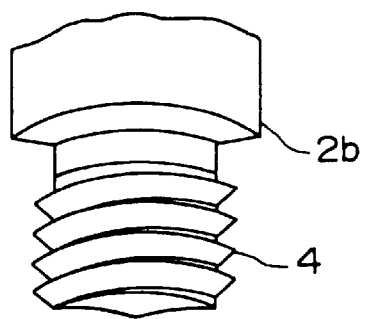
FIGS. 2A shows, to an enlarged scale, an outer fragmentary perspective view of one of the legs in the device of the present invention, FIG. 2B being an inner fragmentary perspective view of FIG. 2A, FIG. 2C being a bottom view showing the three legs in the contracted state thereof.
Figure 2B:
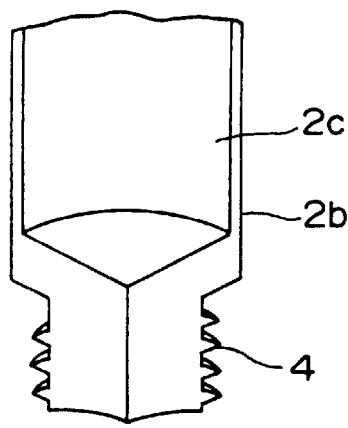
Figure 2C:
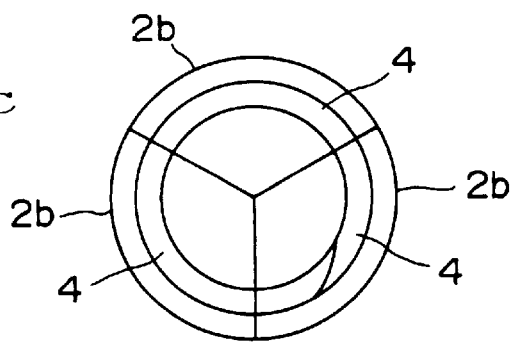
Figure 3A:
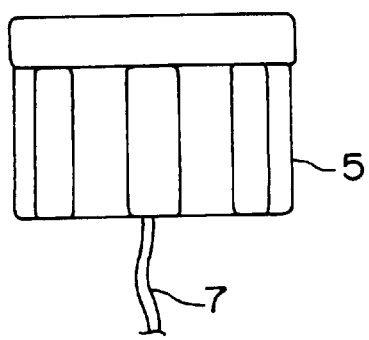
FIGS. 3A and 3B show a blind-nut-like retaining member to be screwed on threaded end portions of the legs shown in FIGS. 1 and 2A to 2C, FIG. 3A being a side view, FIG. 3B being a sectional view.
Figure 3B:
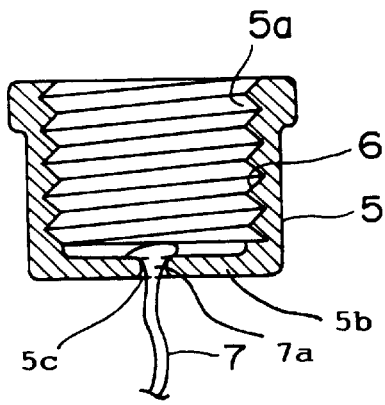

The legs 2 each have a lower end portion 2b formed with a male thread 4. The male thread 4 is shown in detail in FIGS. 2A to 2C. As shown in FIG. 2C, in the contracted state (or closed state) of the legs 2 the male thread portions 4 thereof form a continuous male thread. A blind-nut-like retaining member 5 as shown in FIGS. 3A and 3B is removably mounted on the closed legs 2 with its female thread 6 which screws on the female threads 6. An end 7a of a string 7, which is used when using the device for an inverted plumb-bob device function, is mounted in a mounting hole 5c formed in the bottom 5b of the retaining member 5.

FIG. 1 shows the plumb-bob device having been installed by removing the retaining member 5 from the lower end portions 2b of the legs 2, then expanding the legs 2 away from the outer periphery 1c of the beam-casting housing 1 by rocking the legs 2 about the upper end portions 2a thereof and then setting the lower end portions 2b thereof on a floor surface B on a construction site. With the legs 2 set at their expanded positions in this way, the beam-casting housing 1 is supported vertically through the gyroscopic mechanism 3.

The gyroscope mechanism 3 is well known in the art, for instance from U.S. Pat. No. 5,537,205, and is not described here in detail. As shown in FIG. 4B, the gyroscope mechanism 3 is constructed by a gimbal ring assembly including two concentric rings, i.e., an inner ring 8 and an outer ring 9, and cross-disposed coupling pins 10 coupling these pins 8 and 9 to each other for rocking relative thereto. The beam-casting housing 1 thus can be supported vertically irrespective of the status of setting of the three legs 2.

With the beam-casting housing 1 thus supported vertically above the floor surface B, by turning a rotary switch 11 of the housing 1 at the lower end 1b thereof about the axis of the housing 1 in a direction as shown by arrow E and thus turning on the switch 11, a linear light beam is cast onto the floor surface B to indicate a floor reference point B on a floor reference line D. Then, by sliding a slide switch 12 provided in an upper end portion 1a of the beam-casting housing 1 along the axis of the cylinder 1 in either of directions shown by arrow S and thus turning on the switch 12, a linear laser beam is cast right upward from a beam-casting part 13 of the upper end portion 1a onto the ceiling surface C to indicate a ceiling reference point R corresponding to the floor reference point P. In this way, the vertical level pointing operation is executed.

One of the legs 2 has a window 2d formed at a position corresponding to the slide switch 12. When the legs 2 are contracted and in contact with the outer periphery 1c of the beam-casting housing 1, the window 2d permits accessing and operation of the switch 12 from the outside.

It should be noted that a push-bottom type switch may be used as the switch 12 instead of such sliding type switch.

FIG. 4A shows the internal construction of the beam-casting housing 1, which accommodates the light sources for generating the linear light beams as described before. As shown, in the beam-casting housing 1 a visible semiconductor layer 15 for generating an upward laser beam, a switch base 16 having the slide switch 12 and two series-connected single-phase "5" dry cells 14 connected as a power supply by a spring 24 to the switch base 16, are disposed axially one under another from the upper end portion 1a. A narrow laser beam is thus selectively cast upward from the beam-casting part 13 of the upper end portion 1a in accordance with the on-off operation of the slide switch 12 caused by sliding the same. The above components constitute a first linear light beam generating means. The structure for connecting the slide switch 12, the power supply and the light source to one another, is well known in the art, for instance as disclosed in U.S. Pat. No. 5,644,850, and thus is not described here in detail.

In the lower end portion 1b of the beam-casting housing 1, a metal cell 18 as a power supply, the rotary switch 11 and a high power LED 19 are disposed axially under an insulating member 17 via a spring 25, and a narrow light beam is selectively cast downward in accordance with the on-off operation of the rotary switch 11 caused by turning the same. The above components constitute a second linear light beam generating means. Again the structure for connecting the rotary switch 11, the power supply and the light source to one another is well known in the art, for instance as disclosed in the U.S. Pat. No. 5,644,850, and thus is not described here in detail.

In FIG. 4A, the three legs 2 are shown contracted and retained in this state by the retaining member 5 screwed on their lower end portions 2a. The device in this state is just like a pencil in shape. As shown in FIG. 4C, the three legs 2 each have a curved or concave inner surface 2c complementary to the outer periphery 1c of the beam-casting housing 1. Thus, when the legs 2 are contracted (i.e., closed), they wrap the beam-casting housing 1 in contact with the outer periphery 1c thereof. Thus, the device assumes a shape just like a thin pencil. In this state, the outer periphery 1c of the beam-casting housing 1 is closed by the legs 2. The legs 2 can be reliably held in this closed state by the retaining member 5, and the device can be freely carried without possibility that the switches 11 in the beam-casting housing 1 occasionally touched while the device is carried. While the beam-casting housing 1 in this embodiment is cylindrical, it is possible as well to adopt any other sectional profile, such as polygonal one. In any case, the legs 2 should of course have inner surfaces complementary to the outer periphery of the beam-casting housing 1. The inner surfaces 2c of the legs 2 in the contracted state thereof, may not be in contact with but may be in the vicinity of the outer periphery 1c of the beam-casting housing 1.

In FIG. 1, reference numeral 20 designates a cap which is provided on the upper end portion 1a of the beam-casting housing 1. The cap 20 is hinged by a hinge 21 to the outer ring 9 of the gyroscope mechanism 3. In FIG. 1, the cap 20 is shown open. When the device is not used, the beam-casting part 13 can be covered and protected by closing the cap 20 on the upper end portion 1a of the beam-casting housing 1 and thus covering the upper end portion 1a. In addition, since the lower end portion 1b of the beam-casting housing 2 can be protected by the closed legs 2 and the retaining member 5, the device out of use can be safely carried by covering the upper and lower end portions of the beam-casting housing 1 in the above way.

Figure 5:
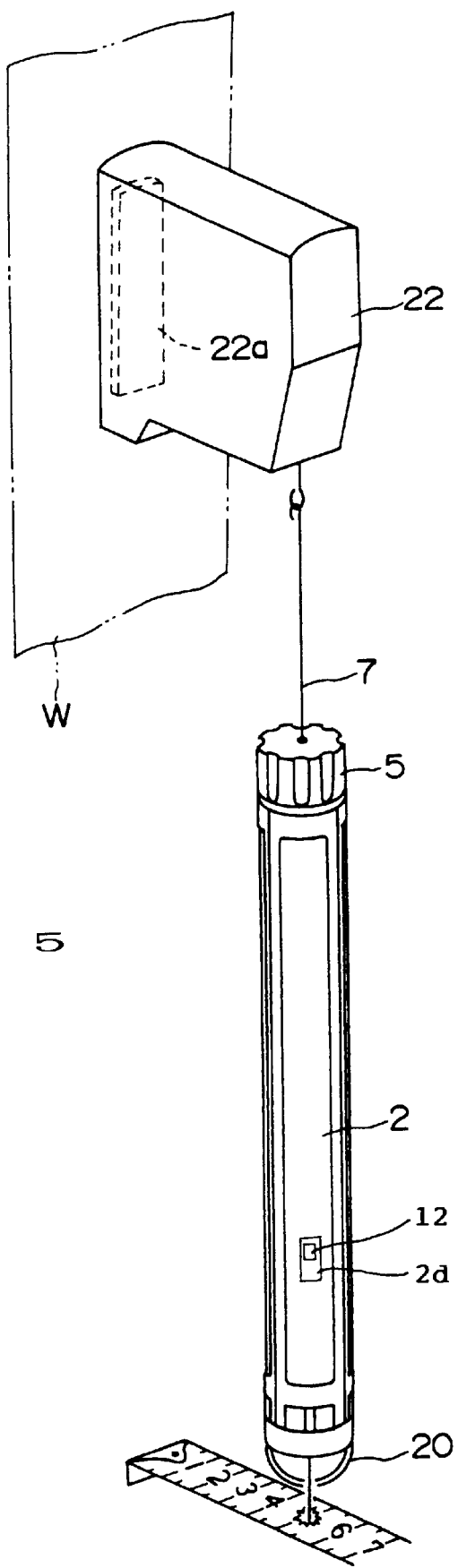
FIG. 5 is a perspective view showing the device shown in FIG. 1 in use in an inverted state.

FIG. 5 shows the plumb-bob device according to the present invention being used in its inverted state. In this use, the device is in the state as shown in FIG. 4A, with the three legs 2 contracted and the retaining member 5 mounted. As shown in FIG. 5, the upper or free end of the string 7 is attached to a hanger 22 having a well-known structure, which is in turn secured to an iron part of a building wall W or the like through a magnet 22a provided in the hanger 22. The string 7 is thus stretched vertically by the inverted device as a weight. The inverted plumb-bob device function is thus provided, and the laser beam is cast downward from the end portion (i.e., upper end 1a in FIG. 1) of the device. The plumb-bob device according to the present invention thus can be used as such or as the inverted plumb-bob device on the construction cite.

Figure 6:
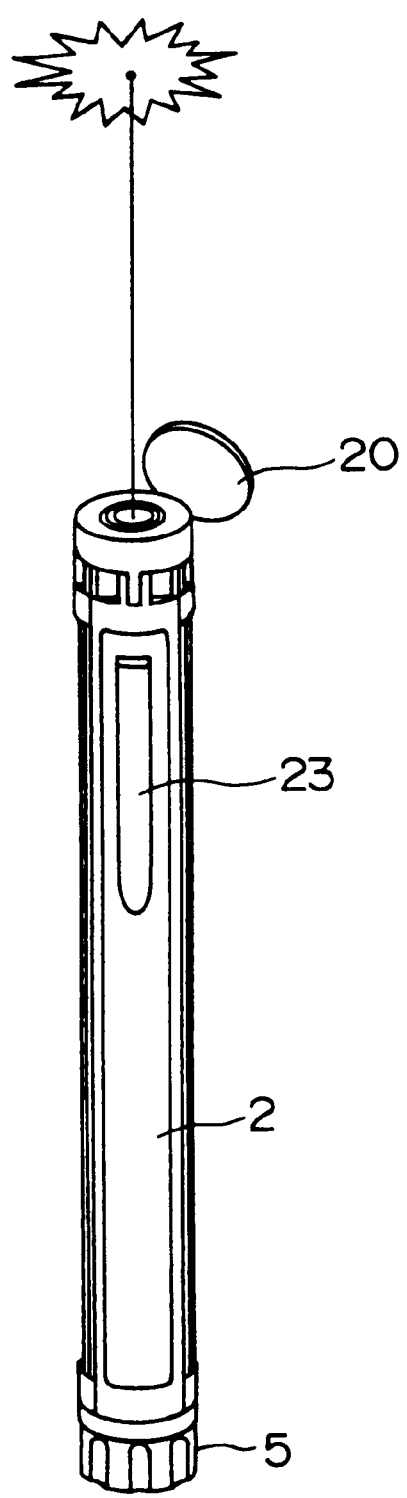
FIG. 6 is a perspective view showing the device shown in FIG. 1 in use as a pointer.

FIG. 6 shows the plumb-bob device according to the present invention being used as a pointer. In this use, the string 7 is removed from the retaining member 5, and the laser beam is generated from the end (i.e., upper end 1a as shown in FIG. 1) of the device. The plumb-bob device according the present invention thus can fulfill the functions as such, as the inverted plumb-bob device and as the pointer for setting various positions. When the device is used as the pointer, the string may be held suitably wound on the retaining member instead of moving it therefrom.

As has been described in the foregoing, the plumb-bob device according to the present invention can assume a pencil-like shape by contracting the legs 2, and in this state it can be freely carried. In order that the device can be conveniently carried in a chest pocket or the like, a device retainer 23 is suitably provided as shown in FIGS. 1 and 6. The device retainer 23 may be mounted by inserting it in a suitable mounting hole formed in the outer surface of one of the legs 2.

What is claimed is:

1. A plumb-bob device, comprising:

An elongated beam-casting housing having an upper end portion and a lower end portion and an axis extending therethrough;

linear light beam generating means provided in the beam-casting housing, for generating a linear light beam cast from the lower end of the beam-casting housing onto a floor surface to indicate a floor reference point thereon and also generating a linear light beam cast from the upper end portion of the beam-casting housing onto a ceiling surface to indicate a ceiling reference point corresponding to the floor reference point;

a plurality of legs each having an upper end portion rockably mounted through a gyroscope mechanism on and around the upper end portion of the beam-casting housing and a lower end portion extending from the upper end portion, the legs each having an inner surface substantially complementary to an outer periphery of the beam-casting housing, and each being rockable between a contracted position, at which the inner surface is in the vicinity of the outer periphery of the beam-casting housing, and a expanded position, at which the lower end portion is spaced apart from the outer periphery, the legs being capable, in the expanded positions thereof, of vertically supporting the beam-casting housing through the gyroscope mechanism; and a retaining member capable of being removably mounted on the lower end portions of the legs in the contracted positions thereof to retain the legs in the contracted position, wherein the outer periphery of the beam-casting housing is closed by the legs when the legs are in the contracted positions, and wherein the retaining member has a blind-nut shape having a bottom and has a string having one end attached to the bottom, whereby an inverted plumb-bob device function is provided by suspending the beam-casting housing, serving as a weight, with the string with the retaining member mounted on the lower end portions of the legs.

2. The plumb-bob device according to claim 1, which further comprises a cap mounted on the upper end portion of the beam-casting housing, the cap being capable of being brought to a closed position to close a beam-casting part, for casting a linear light beam, provided in the upper end portion of the beam-casting housing, and an open position to open the beam-casting part.

3. The plumb-bob device according to claim 1, wherein one of the legs has a device retainer provided on the outer surface thereof.

4. The plumb-bob device according to claim 1, which further comprises a switch for controlling the emission of the linear light beam cast from the upper end portion of the beam-casting housing onto a ceiling surface to indicate a ceiling reference point thereon, one of the legs having a window formed at a position corresponding to the switch, whereby the switch is capable of being accessed from the outside through the window when the legs are in the contracted positions.

* * * * *